United States Patent Office 3,277,181
Patented Oct. 4, 1966

3,277,181
CYCLIC SATURATED THIOETHERS
Ingenuin Hechenbleikner, Cincinnati, Otto A. Homberg, Woodlawn, and Edith H. Miller, Cincinnati, Ohio, assignors to Carlisle Chemical Works, Inc., Reading, Ohio, a corporation of Ohio
No Drawing. Filed July 10, 1963, Ser. No. 294,194
3 Claims. (Cl. 260—609)

The present invention relates to the preparation of novel unsaturated thioethers.

It is known to prepare vinyl aryl thioethers or vinyl octadecenyl thioethers or vinyl alkyl thioethers by reacting acetylene with a thiophenol, octodecenyl mercaptan or an alkyl mercaptan, Reppe Patents 2,081,766 and 2,125,649. To prepare such products it is necessary to use acetylene, a gas, under superatmospheric pressure. Also this procedure only results in the production of vinyl thioethers.

It is an object of the present invention to prepare novel unsaturated thioethers.

Another object is to prepare unsaturated thioethers which do not require acetylene for their manufacture.

An additional object is to improve the heat and light stability of halogen containing resins.

A further object is to provide novel synergestic stabilizers for halogen containing resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The novel unsaturated thioethers of the present invention fall into several groups.

One group of components has the formula

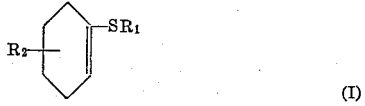

(I)

where $R_1$ is alkyl, alkenyl, aryl or aralkyl and $R_2$ is hydrogen or alkyl but is preferably hydrogen. If $R_2$ is alkyl it is preferably lower alkyl such as methyl, ethyl or butyl.

A second group of unsaturated compounds within the invention has the formula

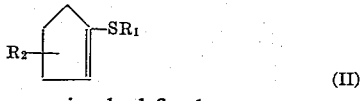

(II)

where $R_1$ and $R_2$ are as previously defined.

A third group of unsaturated compounds within the invention has the formula

$$R_3CH=CHSR_4 \qquad (III)$$

where $R_3$ and $R_4$ are alkyl, aryl, alkenyl or aralkyl.

A fourth group of unsaturated compounds within the invention has the formula

(IV)

where $R_5$ is alkyl or aryl, $R_6$ is hydrogen or alkyl and $R_1$ is as previously defined. $R_6$ is preferably hydrogen.

The preferred compounds are those within Formula I.

Compounds within Formula I are prepared by reacting cyclohexanone or an alkyl substituted cyclohexanone, e.g. 2-methyl cyclohexanone and 3-methyl cyclohexanone, with an equimolar amount of the appropriate mercaptan or thiophenol. Preferably a slight excess of the ketone is employed and the reaction is carried out in a hydrocarbon solvent such as benzene, toluene, xylene or naphtha. The organic solvent serves as a water extrainer and water formed in the reaction is conveniently removed by distillation.

Compounds within Formula II can be prepared in similar fashion by replacing the cyclohexanone with cyclopentanone or alkyl cyclopentanone, e.g. 2-methyl cyclopentanone and 3-methyl cyclopentanone.

Compounds within Formula III can be prepared in similar fashion by reacting an aliphatic aldehyde having at least three carbon atoms with an equimolar amount of a mercaptan or thiophenol. Preferably a slight excess of aldehyde is employed.

Compounds within Formula IV can be prepared in like manner by reacting a dialkyl ketone or an alkyl aryl ketone with an equimolar amount of the appropriate mercaptan or thiophenol. Preferably a slight excess of the ketone is employed.

There can be employed an acid catalyst such as benzenesulfonic acid, p-toluene sulfonic acid, hydrochloric acid, hydrobromic acid or sulfuric acid.

An alternative procedure is to react two moles of the appropriate mercaptan or thiophenol with 1 mole of ketone or aldehyde to form a thioacetal and then pyrolyze the thioacetal.

To make the compounds of Formula III there can be used aldehydes such propionaldehyde, butyraldehyde, valeraldehyde, phenylacetaldehyde, phenylpropionaldehyde, isovaleraldehyde, caprylaldehyde, isodecaldehyde, enanthaldehyde, 2-ethyl butyraldehyde, and stearaldehyde. To make the compounds of Formula IV there can be used ketones such as acetone, methyl ethyl ketone, methyl propyl ketone, methyl butyl ketone, methyl isobutyl ketone, ethyl propyl ketone, acetophenone, propiophenone, diethyl ketone, dipropyl ketone, methyl amyl ketone and stearanone. The aldehyde or ketone employed must have a hydrogen atom attached to a carbon atom alpha to the carboxyl group.

As the mercapto containing compound for reaction with the aldehyde or ketone to make the compounds of the invention there can be used methyl mercaptan, propyl mercaptan, butyl mercaptan, hexyl mercaptan, cyclohexyl mercaptan, octyl mercaptan, isooctyl mercapton, 2-ethylhexyl mercaptan, decyl mercaptan, lauryl mercaptan, octadecyl mercaptan, benzyl mercaptan, crotyl mercaptan, oleyl mercaptan, thiophenol, thio-o-cresol, thio-p-cresol, thio-m-cresol, thio-m-cresol, thio-α-napthol, thio-β-napthol, thio-p-dodecylphenol, thioxylenol.

Illustrative of compounds within Formula I are 1-thiomethyl cyclohexene, 1-thioethyl cyclohexene, 1-thiobutyl cyclohexene, 1-thioisobutyl cyclohexene, 1-thiooctyl cyclohexene, 1-thiododecyl cyclohexene, 1-thiooctadecyl cyclohexene, 1-thiooleyl cyclohexene, 1-thiocrotyl cyclohexene, 1-thiobenzyl cyclohexene, 1-thiophenol cyclohexene, 1-o-thiocresyl cyclohexene, 1-p-thiocresyl cyclohexene, 1-m-thiocresyl cyclohexene, 1-p-thiooctylphenyl cyclohexene, 1-thioxylenyl cyclohexene, 1-β-thionaphthyl cyclohexene, 1-α-thionaphthyl cyclohexene, 1-thiododecyl-2-methyl cyclohexene, 1-thiobutyl-3-methyl cyclohexene, 1-thiooctyl-3-butyl cyclohexene, 1-thio-2-ethylhexyl cyclohexene, and 1-thiocyclohexyl cyclohexene.

Illustrative of compounds within Formula II are 1-thiomethyl cyclopentene, 1-thioethyl cyclopentene, 1-thiopropyl cyclopentene, 1-thiobutyl cyclopentene, 1-thiohexyl cyclopentene, 1-thiooctyl cyclopentene, 1-thiodecyl cyclopentene, 1-thiododecyl cyclopentene, 1-thiooctadecyl cyclopentene, 1-thiooleyl cyclopentene, 1-thiophenyl cyclopentene, 1-thio-p-cresyl cyclopentene, 1-thioheptyl-3-methyl cyclopentene, 1-thioamyl-2-ethyl cyclopentene, 1-thiobenzyl cyclopentene and 1-thio-β-naphthyl cyclopentene.

Compounds within Formula III include 9-thiaheptadecene-10.

9-thianonadecene-10; 2-thiapentene-3; 3-thiaheptene-4; 5-thia-2-methyl tridecene-3

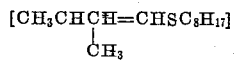

5-thiatricosene-6; 6-thia-tetracosene-7; 4-thiadecene-2; 4-thiatetradecene-5, 5-thia-7-ethyl-undecene-6; 1-phenyl-3-thiaheptene-1; 1-phenyl-4-thia-octene-2; 1-octenyl phenyl sulfide

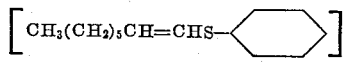

hexenyl p-cresyl sulfide; 1-phenyl-2-thiadecene-3, 5-thiadodecadiene 2,6.

Illustrative of compounds within Formula IV are S-dodecyl-1-phenyl-1-thioethylene

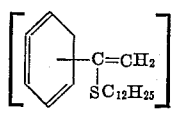

S-octyl-1-phenyl-1-thioethylene, S-butyl-1-phenyl-1-thioethylene, S-methyl-1-phenyl-1-thioethylene; S-phenyl-1-thioethylene, S-p-tolyl-1-phenyl-1-thioethylene, S-benzyl-1-phenyl-1-thioethylene, 2-thiooctylpropene

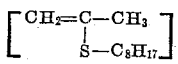

2-thiobutylpropene, 2-thiomethylpropene, 2-thioethylpropene, 2-thioamylpropene, 2-thiododecylpropene, 2-thiooctadecylpropene, 2-thiocrotyl-propene, 2-thiooleylpropene, 2-thiobenzylpropene, 2-thio 2-naphthylpropene, 1-phenyl-1-thiobutyl-propene-1, 2-thiooctylbutene-1, 2-thiooctylbutene-2, 2-thiohexyl butene-1, 2-thiocyclohexyl propene, 2-thiodecylpentene-1,2-thiophenyl propene, 2-thio-o-cresyl-propene, 2-thiohexadecylhexene-1, 3-thiooctylpentene-2, 3-thiophenyl-pentene-2, 4-thiopropylheptene-3, 18-thiobutylpentatriacontene-17.

The compounds of the present invention can be recovered in pure form by distillation, usually at reduced pressure. To purify the product it is frequently desirable to wash the reaction mixture with a weakly alkaline solution such as aqueous sodium bicarbonate or potassium bicarbonate.

The compounds of the present invention are useful as stabilizers for halogen containing materials particularly when used with tin compounds such as dialkyltin oxides and dialkyltin acylates.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilizers, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g. 27% chlorine by weight, polyvinyl chloride, polyvinylidene chloride, polyvinyl bromide, polyvinyl fluoride, copolymers of vinyl chloride with 1 to 90%, preferably 1 to 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

Examples of suitable tin compounds for use as stabilizers with the compounds of the present invention are dibutyl tin oxide, dibutyltin dilaurate, dioctyltin oxide, dioctyltin dilaurate.

The compounds of the present invention are normally used in an amount of 0.01 to 10% by weight of the resin.

The tin compounds are also normally used in an amount of 0.01 to 10% by weight of the resin. More preferably 0.2 to 5% of the tin compound and 0.2 to 5% of the sulfur compounds of the present invention are used on the weight of the resin.

Unless otherwise indicated all parts and percentages are by weight.

*Example 1*

1 mole of lauryl mercaptan and 1.2 moles of cyclohexanone were refluxed in toluene (20% by weight of the reactants) with 3 grams of p-toluenesulfonic acid as a catalyst with removal of water until 18 grams (1 mole) of water were obtained. The reaction mixture was washed with a saturated aqueous solution of sodium bicarbonate and then distilled. The product was 1-thiododecyl cyclohexene (also called S-dodecyl thiocyclohexene) a colorless liquid $n_D^{25}$ 1.4913, B.P.$_{0.5}$ 159–170° C. (Yield 68%.) (In the examples all boiling points are at the indicated mm. of Hg.)

*Example 2*

The same products, as that of Example 1 was produced by refluxing 2 moles of lauryl mercaptan with 1 mole of cyclohexanone in 200 cc. of toluene with 3 grams of p-toluenesulfonic acid as a catalyst with removal of water until 18 grams of water were obtained. The reaction mixture was then washed with a saturated aqueous solution of sodium bicarbonate. The product was then pyrolyzed by heating to a high temperature under vacuum to form the 1-thiododecyl cyclohexene.

*Example 3*

The procedure of Example 1 was repeated replacing the lauryl mercaptan by one mole of octyl mercaptan. The product was 1-thiooctyl cyclohexene, a colorless liquid, B.P.$_{2.5}$ 145–155° C. (Yield 75%.)

*Example 4*

The procedure of Example 1 was repeated replacing the lauryl mercaptan by 1 mole of thiophenol. The product was 1-thiophenyl cyclohexene, a liquid $n_D^{25}$ 1.5821, B.P.$_{0.1}$ 107–115° C. (Yield 52%.)

Example 5

The procedure of Example 1 was repeated replacing the lauryl mercaptan by 1 mole of benzyl mercaptan. The product was 1-thiobenzyl cyclohexene, a high boiling liquid.

Example 6

The procedure of Example 1 was repeated replacing the cyclohexanone by 1.2 moles of cyclopentanone. The product was 1-thiododecyl cyclopentene, a high boiling liquid.

Example 7

The procedure of Example 1 was repeated replacing the reactants (i.e. the cyclohexanone and lauryl mercaptan) by 1 mole of octyl mercaptan and 1.2 moles of decylaldehyde. The product was 9-thianonadecene-10, a liquid $n_D^{25}$ 1.4741, B.P.$_{0.4}$ 160–170° C. (Yield 50%.)

Example 8

The procedure of Example 1 was repeated replacing the reactants of 1 mole of octyl mercaptan and 1.2 moles of octaldehyde. The product was 9-thioheptadecene-10, a high boiling liquid.

Example 9

The procedure of Example 1 was repeated replacing the reactants by 1 mole of thiophenol and 1.2 moles of butyraldehyde. The product was 1-butenyl phenyl sulfide, a liquid.

Example 10

The procedure of Example 1 was repeated replacing the reactants by 1 mole of lauryl mercaptan and 1.2 moles of acetophenone. The product was S-dodecyl-1-phenyl-1-thioethylene, an orange yellow liquid, B.P.$_3$ 155–205° C. (Yield 20.4%.)

Example 11

The procedure of Example 1 was repeated replacing the reactants by 1 mole of octyl mercaptan and 1.2 moles of acetone. The product was 2-thiooctylpropene, a colorless liquid $n_D^{25}$ 1.4628, B.P.$_{15}$ 60–90° C. (Yield 18.5%.)

Example 12

The procedure of Example 1 was repeated replacing the reactants by 1 mole of octyl mercaptan and 1.2 moles of acetophenone. The product was S-octyl-1-phenyl-1-thioethylene, a grayish liquid B.P. 142–158° C. (Yield 11%.)

Example 13

The procedure of Example 1 was repeated replacing the reactants by 1 mole of thiophenol and 1.2 moles of diethyl ketone. The product was 3-thiophenyl pentene-2, a high boiling liquid.

Example 14

100 parts of Geon 101EP (vinyl chloride homopolymer) was mixed with 0.37 part dibutyltin oxide and 0.30 part of 1-thiododecyl cyclohexene to form a heat stable product. Similar results are obtained by replacing the 1-thiododecyl cyclohexene by an equal amount of 1-thiophenyl cyclohexene, or 1-thiododecyl cyclopentene, or 9-thiaheptadecene-7, or S-dodecyl-1-phenyl-1-thioethylene, or 2-thiooctylpropene.

Example 15

Example 14 was repeated but 50 parts of dioctyl phthalate were included in the composition. The product was heat stable.

What is claimed is:
1. 1-thioalkenyl cyclo-alkenes wherein the cycloalkene ring has 5 to 6 carbon atoms having up to one lower alkyl substituent on the cyclic alkene.
2. 1-thiohydrocarbyl cyclopentenes wherein the thiohydrocarbyl groups is thioalkyl, thioalkenyl, thioaryl or thiobenzyl.
3. 1-thioalkyl cyclohexene wherein there are 8 to 12 carbon atoms in the thioalkyl group.

References Cited by the Examiner

Chandra: Chem. Abs., 30, 63406 (1936).
Goering et al.: J. Am. Chem. Soc. 78, 352 (1956).

CHARLES B. PARKER, *Primary Examiner.*

D. R. PHILLIPS, *Assistant Examiner.*